United States Patent [19]

Nichols

[11] Patent Number: 4,629,330
[45] Date of Patent: Dec. 16, 1986

[54] COLOR-CHANGE INDICATOR

[75] Inventor: Larry D. Nichols, Arlington, Mass.

[73] Assignee: Moleculon Research Company, Cambridge, Mass.

[21] Appl. No.: 711,634

[22] Filed: Mar. 14, 1985

[51] Int. Cl.$^4$ ............................ G04F 1/00; G01K 1/02
[52] U.S. Cl. ...................................... 368/89; 368/327; 116/216; 374/102
[58] Field of Search ......................... 368/89, 114, 327; 116/206, 216, 219; 374/102, 161

[56] References Cited

U.S. PATENT DOCUMENTS

| | | | |
|---|---|---|---|
| 3,480,402 | 11/1969 | Jackson | 368/89 |
| 3,962,920 | 6/1976 | Manske | 368/327 |
| 4,022,149 | 5/1977 | Berger | 116/219 |
| 4,195,058 | 3/1980 | Patel | 116/206 X |
| 4,280,441 | 7/1981 | McNeely | 116/219 |
| 4,382,700 | 5/1983 | Youngren | 368/327 |
| 4,404,922 | 9/1983 | Morane et al. | 368/327 |
| 4,408,557 | 10/1983 | Bradley et al. | 368/327 |

Primary Examiner—Vit W. Miska
Attorney, Agent, or Firm—Joseph S. Iandiorio

[57] ABSTRACT

A color change indicator including: a liquid having a predetermined index of refraction and rate of evaporation; a reservoir for holding the liquid; and an opacifying layer of microporous material. The opacifying layer has an index of refraction approximately the same as that of the liquid and overlies the reservoir. The opacifying layer has an open-cell network of pores for absorbing the liquid from the reservoir and is in a first radiation scattering condition when the liquid occupies the opacifying layer and in a second scattering condition when the liquid is depleted from the opacifying layer.

34 Claims, 7 Drawing Figures

COLOR-CHANGE INDICATOR

FIELD OF INVENTION

This invention relates to a color-change indicator of time and temperature or of remaining liquid content, and more particularly to such an indicator using liquids of known evaporation rates.

BACKGROUND OF INVENTION

A variety of devices utilize a rise in temperature to alter an element to indicate when temperature exceeds a certain level. Several devices include elements which decompose, melt, boil or sublime at predetermined temperatures. Some devices use a normally opaque material to reveal a previously concealed message. One such material is benzil, which when heated becomes transparent.

In many applications the detection of a simple rise in temperature is not sufficient. A large number of pharmaceuticals and foods expire as a function of both time and temperature. Composite polymeric structures must be maintained at a set temperature for a set time to achieve proper cure. Effective indicators of expiration, shelf life, or cure must therefore reflect time as well as temperature. Disappearance of an ablative material is used in some shelf-life indicators to gradually reveal an underlying message. Others use advancing color fronts generated by passage of liquids or gases through wicks.

Some inventory control systems chronologically predict when a product may expire. Numbers or color-coding indicate the day of the month or other calendar period when an observer is to dispose of the product without considering the actual effect of ambient temperature.

Devices which dispense volatile materials indicate remaining capacity in several ways. The overall dispensing structure may be transparent to allow direct observation of the contents. If the volatile material contains dye, the color may become more intense as the liquid evaporates and the concentration of the remaining dye increases. Alternatively, the dye may gradually disappear from the surface of the dispenser as the dye concentrates in other regions or precipitates out of solution.

SUMMARY OF INVENTION

It is therefore an object of this invention to provide an improved color-change indicator which changes condition as a function of time and temperature.

It is a further object of this invention to provide such an indicator exhibiting a change in visual appearance only near the end of a predetermined time and temperature period.

It is a further object of this invention to provide such an indicator capable of spanning a wide range of predetermined time periods at a variety of temperatures.

It is a further object of this invention to provide an improved color-change indicator of remaining liquid content.

It is a further object of this invention to provide an improved color-change indicator which assures quality during curing of composites at elevated temperatures for set time periods.

It is a further object of this invention to provide an improved color-change indicator facilitating accurate time- or time-and-temperature-based inventory control.

It is a further object of this invention to provide such an indicator exhibiting a change in visual appearance only when the content is nearly exhausted.

It is a further object of this invention to provide such an improved color-change indicator using a liquid of known evaporation rate.

This invention features a color change indicator including a liquid having a predetermined index of refraction and rate of evaporation, a reservoir for holding the liquid, and an opacifying layer of microporous material. The opacifying layer has an index of refraction approximately the same as that of the liquid and overlies the reservoir. The opacifying layer has an open-cell network of pores for absorbing the liquid from the reservoir and is in a first radiation scattering condition when the liquid occupies the opacifying layer and in a second scattering condition when the liquid is depleted from the opacifying layer.

In a preferred embodiment the opacifying layer has an index of refraction within 0.1 of the index of refraction of the liquid so that it is generally transparent when occupied by the liquid. Typically, the opacifying layer is transparent in the first condition and opaque in the second condition due to internal ray scattering of incident light. The rays are scattered either by solid objects within the opacifying layer, such as particles, or by internal spaces or voids within the layer, such as pores.

The indicator may further include an image medium which is either invisible when the opacifying layer is in the first condition and visible during the second condition or is visible in the first condition and invisible during the second. When the image medium is invisible in the first condition, the medium may include a message element located in and penetrating through the opacifying layer which remains transparent in the second condition. The message element may also be impressed on the opacifying layer. It is preferred that the impression collapse a sufficient number of pores in the opacifying layer to allow transmission of incident light. The message element may also be defined by resin having an index of refraction similar to that of the opacifying layer. To accentuate the message element, the image medium may include a layer of colored pigments beneath the opacifying layer.

When the image medium is visible while the opacifying layer is in the first condition and invisible in the second condition, the image medium may include a message element that has colored pigments and is located above the opacifying layer, and a colored layer that is beneath the opacifying layer and has colored pigments similar in color to those of the message. Alternatively, the image medium may include a message located above the opacifying layer, having a visual appearance which matches that of the opacifying layer in the second condition such that the message is visible in the first condition and invisible in the second condition. In another embodiment, the image medium includes a message element located beneath the opacifying layer, such as pigments in a porous adhesive which bonds the opacifying layer to the reservoir.

Other embodiments of the invention feature a reservoir including microporous absorbent material having pores larger than the pores of the opacifying layer, a liquid which is transparent, and a second liquid combined with the first liquid and having a different predermined rate of evaporation. The opacifying layer either has a cross-sectional thickness including at least 10 pores, or includes particles having an index refraction approximately the same as that of the liquid where the opacifying layer has a cross-sectional thickness of at least 10 of those particles. It is preferred that the opacifying layer be less than 135 microns in thickness and remain in the first condition until the liquid is depleted from the reservoir, at which time the opacifying layer abruptly changes to the second condition.

In one embodiment, the opacifying layer covers one portion of the reservoir and a vapor barrier layer covers the remaining portion. The reservoir may be flattened in shape having the opacifying layer on its upper surface and a barrier layer on its lower surface, and may further include means for mounting the indicator on the product to be monitored. The indicator further includes a removable barrier, overlying at least a portion of the opacifying layer, for retarding evaporation.

The invention also encompasses a method of indicating the passage of time and temperature or depletion of a fluid including placing a liquid of known index of refraction and rate of evaporation into a reservoir, overlying the reservoir at least partially with an opacifying layer of microporous material having an index of refraction similar to that of the liquid and having an open-cell network of pores for absorbing the liquid from the reservoir, and permitting the liquid to evaporate and change the opacifying layer from one radiation-scattering condition when it is occupied by the liquid to a second radiation-scattering condition when the liquid is depleted.

The method may further include several overlying processes. The step of overlying may include laminating a film of microporous material to the reservoir, coating the reservoir with a mixture of particles in a water-soluble solvent, or coating the reservoir with a solution of a polymer in a water-soluble solvent and immersing the reservoir in water.

DISCLOSURE OF PREFERRED EMBODIMENTS

Other objects, features and advantages will occur from the following description of preferred embodiments and the accompanying drawings, in which.

Figure 1:
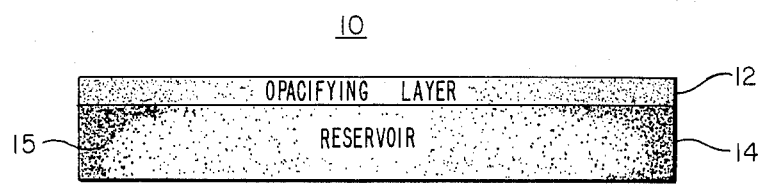
FIG. 1 is a schematic cross-sectional elevational view of one embodiment of the invention.

Color change indicator 10 is shown in FIG. 1 having opacifying layer 12 overlying reservoir 14. Stippling 15 represents a liquid within both reservoir 14 and opacifying layer 12 which is selected for its index of refraction and its rate of evaporation. The stippling varies in density for artistic purposes only.

Opacifying layer 12 is a microporous material with an index of refraction approximately the same as that of the liquid and an open-cell network of pores for absorbing the liquid from the reservoir. Layer 12 is in a first radiation-scattering condition when the liquid occupies the opacifying layer and in a second scattering condition when the liquid is depleted from the opacifying layer. Preferably opacifying layer 12 is transparent in the first condition and opaque in the second condition due to internal ray scattering of incident radiation. The ray scattering is produced by the surfaces of small solid objects, such as particles, by internal voids, such as pores, or both. Incident radiation is scattered, primarily through refraction, when passing from one index of refraction to another index of refraction. The greater the difference in indices of refraction, the greater the scattering. Water has an index of refraction of approximately 1.33 at 20° C. for sodium light having a wavelength of 5893 angstroms while heavy organic liquids may have an index of refraction of 1.8 or 1.9. It is desirable for the opacifying layer to have an index of refraction within 0.1 of the index of refraction of the liquid, and preferable that the index be within 0.05 of that of the liquid.

Figure 4A:
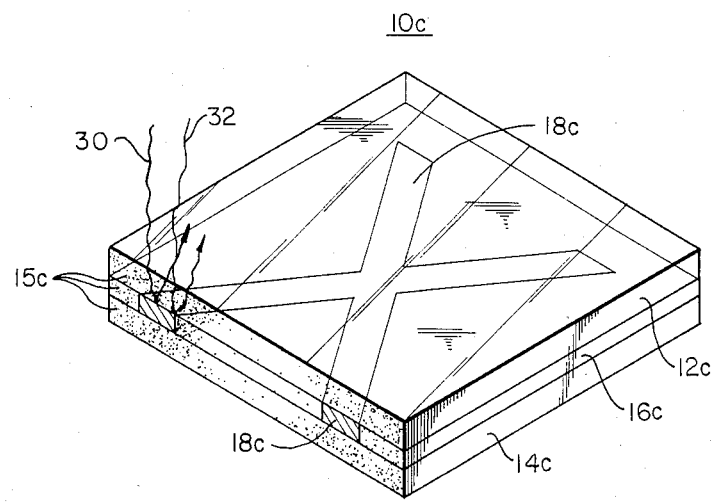
FIG. 4A is a schematic axonometric view of one embodiment of the invention with the opacifying layer transparent and the image medium invisible.
Figure 4B:
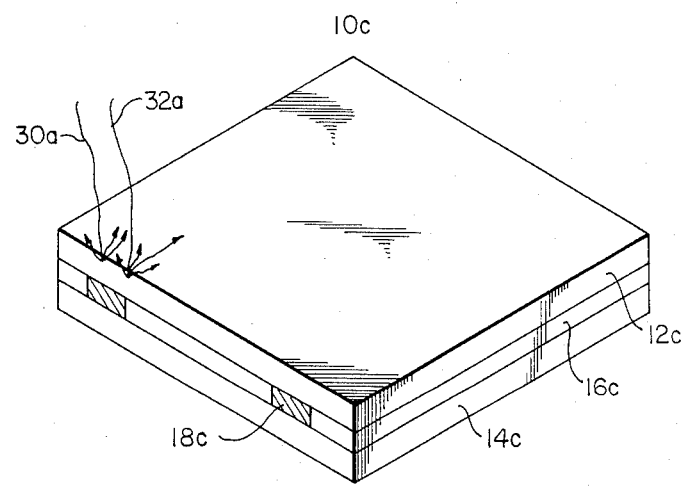
FIG. 4B is a view similar to FIG. 4A of an opaque opacifying layer and invisible image medium.

When the liquid is generally depleted from the opacifying layer, the pores within the opacifying layer become filled with air having an index of refraction of approximately 1.00. Any particles in the opacifying layer are likewise surrounded in part by air such that incident radiation now encounters successive boundaries having different indices of refraction as the radiation attempts to penetrate through the opacifying layer. The difference in scattering condition is illustrated in FIGS. 4A and 4B, as described below.

Reservoir 14, FIG. 1, may be any material capable of holding the liquid so that opacifying layer 12 may continue to absorb liquid from the reservoir until the reservoir is depleted in such liquid. In one embodiment, reservoir 14 includes macroporous absorbent material having pores at least slightly larger than those of the opacifying layer so that the opacifying layer remains occupied by the liquid until the reservoir is depleted. The smaller pores of the opacifying layer exhibit a wicking or capillary action which competes preferentially to absorb liquid from the reservoir. Cellulose in the form of paper is a preferred material. Other materials include spin-bonded polypropylene.

Liquid 15 has a predetermined index of refraction and rate of evaporation, and is selected at least for its index of refraction. In one embodiment, the color-change indicator monitors the presence of a liquid in the reservoir where the liquid is selected also for properties other than index of refraction and rate of evaporation, such as fragrance or repellency to insects. In another embodiment, the indicator indicates the passage of time and temperature and the liquid is selected also for its rate of evaporation. It is preferable that liquid 15 be transparent; that is, that it transmit at least one wavelength of incident radiation without strong absorption or scattering. Colored liquids which transmit some wavelength are thus considered transparent for purposes of this invention. It is desirable that liquid 15 be odorless, non-flammable, and non-toxic. Low and middle molecular weight silicone liquids such as decamethyltetrasiloxane, tetradecamethylhexasiloxane, or their cyclic analogs are preferred. Other desirable liquids are branched or unbranched aliphatic hydrocarbons having ten to twenty carbon atoms per molecule.

Two or more liquids having different rates of evaporation may be combined to provide a total rate of evaporation selected for a particular time and temperature period over which the indicator is to operate. For liquids such as aliphatic hydrocarbons which form nearly ideal solutions when mixed, the evaporative lifetime of a mixture is very close to the linear sum of the lifetimes of the components, which facilitates the design of color-change indicators for specific applications.

After the reservoir is depleted, the interval during which the opacifying layer changes from the first radiation-scattering condition to the second condition is related to the evaporative lifetime of the liquid. The change interval of an ideal liquid for purposes of illustration is generally 10% of the lifetime of a 200 mg sample of the given liquid. Thus, if 200 mg of liquid A in a specific indicator would lead to a change in appearance after 10 days, having a change interval of 1 day, and 100 mg of another liquid B would lead to a change after 30 days, having a change interval of 6 days, then the use of 300 mg of a 2:1 mixture of A with B will lead to a change after approximately 10+30=40 days. An indicator loaded with such a mixture of liquids of differing volatility will, however, show an interval of changing color which is close to that of the least volatile component and therefore somewhat longer than that of a pure liquid providing the same overall lifetime. In the above example, the 2:1 mixture of A and B is dependent upon B and would be expected to change appearance over approximately a 6-day interval. If a pure liquid could be found with a 40-day lifetime at the 300 mg load level, it would change appearance in (40 days) (200 mg/300 mg) (0.10)=2.7 days as compared with the 6-day change interval of the mixture.

Figure 2:
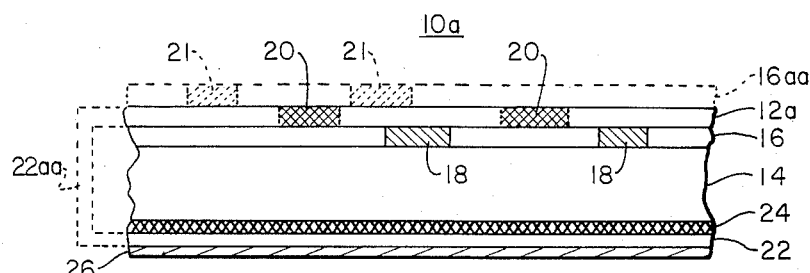
FIG. 2 is a view similar to FIG. 1 of another embodiment of the present invention.

Color change indicator 10a is shown in FIG. 2 having opacifying layer 12a, reservoir 14a, and further including an image medium, layer 16. Layer 16 is visible when opacifying layer 12a is transparent and is hidden when opacifying layer 12a is opaque. The term "visible" includes capable of being detected under certain conditions, such as when the indicator is in the presence of ultraviolet light, infrared light, or other predefined wavelengths of incident radiation, whether or not visible to the eye.

Layer 16 may include a message element such as pigments 18 to accentuate the difference in indicator 10a when opacifying layer 12a is in a first radiation-scattering condition from when it is in a second scattering condition. Pigments 18 may include a colored inorganic element such as ochre, or a colored organometallic pigment such as copper phthalocyanine, or an insoluble organic pigment such as Aniline Black. Pigments 18 are held on layer 16 with an acrylic latex binder such as Binney and Smith Liquitex Acrylic Gel Medium. Other binders, such as polyvinylacetate resin, may also be used as long as they do not block the pores and thereby inhibit passage of liquid. To conserve binder if the opacifying layer is wet-coated onto the reservoir, it is advantageous to employ a solvent of mixed volatility which leads to binder precipitation promptly after application, before the liquid coating vehicle has had much opportunity to soak into the underlying absorbent material where the binder is not needed. It is preferred that pigments 18 be totally insoluble in the liquid. The pigments may underlie most or all of the opacifying layer or may be arranged as a pattern or as text to convey a message such as "empty" or "stale".

Paper or a fine-textured, smooth, non-woven fabric such as a polyolefin fabric can provide the structural portion of layer 16. In another embodiment layer 16 is a porous adhesive which bonds the opacifying layer to the reservoir. The adhesive is porous when dried or cured and does not clog the pores in opacifying layer 12a. One such adhesive is wheat paste.

In another embodiment, the image medium includes message element 20 which is located in and penetrates through opacifying layer 12a. Message element 20 is invisible when opacifying layer 12a is transparent and becomes visible when opacifying layer 12a is opaque because element 20 permits transmission of incident radiation at all times. Message element 20 may be a resin having an index of refraction similar to that of opacifying layer 12a, where the resin fills the pores and surrounds any particles located in opacifying layer 12a to maintain a similar index of refraction throughout the depth of opacifying layer 12a, thereby minimizing ray scattering. Resin such as polyacrylates or cellulose derivatives may be used, or any other resin, having an appropriate index of refraction, which is insoluble in the volatile liquid. Alternatively, message element 20 may be physically impressed on opacifying layer 12a such that the impression collapses, to a sufficient extent, a sufficient number of pores on the opacifying layer to allow the transmission of incident radiation.

Although the image may consist exclusively of message element 20, it is preferred that layer 16 have pigments 18 underlying a portion of layer 12a, but not directly underlying message element 20, to accentuate the image medium when opacifying layer 12a is opaque. Another arrangement of elements to provide an image medium which is invisible when the opacifying layer is in the first radiation-scattering condition and visible during the second condition includes a message element located above the opacifying layer having colored pigments, and a colored layer beneath the opacifying layer which has colored pigments similar in color to those of the message element.

Alternatively, the image medium may be visible in the first scattering condition and invisible in the second condition. In one embodiment, the image medium includes layer 16aa, shown in outline form in FIG. 2, located above opacifying layer 12a. Portion 21 of layer 16aa has a visual appearance which matches the opacifying layer in the second condition such that the message element is visible in the first condition and invisible in the second condition. To provide contrast for portion 21, serving as a message element, indicator 10a has a visual appearance, excluding portion 21, that differs from the visual appearance, such as a whitish appearance, of opacifying layer 12a in the second scattering condition. Contrast may be provided by pigments 18. For example, portion 21 may be a whitish color and pigments 18 may provide a non-white background during the first scattering condition.

Figure 3A:
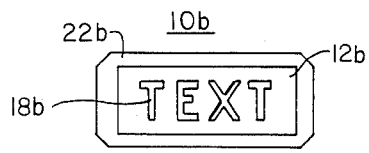
FIG. 3A is a schematic plan view of the invention when the opacifying layer is transparent and the image medium is visible.
Figure 3B:
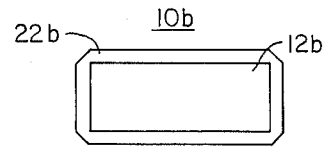
FIG. 3B is a view similar to FIG. 3A when the opacifying layer is opaque and the image medium is invisible.

An image medium visible when the opacifying layer is transparent and invisible otherwise is shown in FIGS. 3A and 3B respectively. Indicator 10b has an image medium containing pigments 18b serving as the message element. Pigments 18b are located beneath opacifying layer 12b which is in the transparent condition. Vapor barrier 22b is seen extending from beneath indicator 10b to overlie the border of the opacifying layer 12b. The image medium appears blurred and indistinct when opacifying layer 12b is in the first condition and greater than 130 microns in thickness, as described below regarding FIGS. 4A and 4B, unless layer 12b has an index of refraction closer than 0.1 to that of the liquid or mixture of liquids. The transparency of the opacifying layer in the first condition is a function both of its thickness and its index of refraction as compared to the index of the liquid or liquids.

Indicator 10b having opacifying layer 12b in the opaque condition, such that the message element of pigments 18b is invisible, is depicted in FIG. 3B. Vapor barrier 22b again forms a border. Alternatively, border 22b may be another material, particularly a colored material which further defines the image medium.

Opacifying layer 12a, FIG. 2, may be a film laminated onto reservoir 14a using a special adhesive such as wheat paste, or may be made in place as a coating. The film may be a cellulose triacetate product such as Seraphore III made by Gelman for electrophoresis, a porous polypropylene such as Celgard made by Celanese, or a porous anti-galling tape such as Teflon tape. Alternatively, cast cellulose triacetate may be whitened by immersion in an acetic acid solution in warm water and then dried.

Instead of laminating a previously formed film, a microporous coating can be applied to reservoir 14a or layer 16aa or layer 16. One of the above elements may be coated with a solution of a polymer in a water-soluble solvent, and then immersed in water to produce an intensely hazy coating. The polymer may be cellulose triacetate or less fully acetylated cellulose acetate, mixed cellulose esters, or non-cellulosic polymers such as an acetone solution of polymethylmethacrylate.

In another embodiment, opacifying layer 12a is formed from a coating of microscopic particles having an index of refraction approximately the same as that of the liquid, for reasons described above. Coatings may be prepared from aqueous latex emulsions containing colorless pigments. Acceptable powders are calcium fluoride, powdered silica, powdered polyethylene, magnesium fluoride, calcium stearate, and magnesium stearate. These particles are bound together with a binder such as polymethylmethacrylate, polyvinylacetate, cellulose triacetate in methylene chloride or cellulosics, or other suitable solvent. Desirable sizes of both particles and voids are discussed below.

Indicator 10a may further include vapor barrier layer 22 if opacifying layer 12a does not totally surround reservoir 14a. Increasing the surface of the reservoir exposed to air increases the overall evaporation of the liquid and decreases the effective life of the indicator. Typically, opacifying layer 12a covers one portion of reservoir 14a and vapor barrier 22 covers the remaining portion. Barrier 22 may be aluminum foil, Barex film, aluminum-polymer film laminates, or Cellophane and serves to prevent escape of the liquid other than through the opacifying layer. As indicated by dotted line 22aa, barrier 22 may cover the bottom and side, and upper surfaces of reservoir 16a not otherwise covered by layer 12a. Vapor barrier 22 may be attached to reservoir 14a by bonding means 24, such as an epoxy adhesive, or by thermoplastic heat sealing techniques.

In a preferred embodiment, indicator 10a is in the form of a label to be applied to a product to monitor the passage of time and temperature in the ambient surroundings. Reservoir 14a is flattened in shape having opacifying layer 12a on its upper surface and barrier 22 on its lower surface with conventional mounting means 26 for attaching indicator 10a to a product. A portion of vapor barrier 22 serves as an interface between reservoir 14a and mounting means 26. Indicator 10a may also include a removable barrier [not shown] of material similar to that of vapor barrier 22 and overlying a portion of opacifying layer 12a for retarding evaporation of the liquid. The removable barrier may completely overlie the opacifying layer to protect the indicator, to allow ease of handling, or to insure against premature evaporation of the liquid. Alternatively the same function may be provided by sealing such indicator in a nonpermeable envelope until use.

The effect of liquid 15c on ray scattering of incident radiation, depicted by rays 30 and 32, is shown in FIG. 4A for indicator 10c having opacifying layer 12c in the transparent condition. In this condition, the image medium including pigments 18c, contained in layer 16c, is visible through opacifying layer 12c. Liquid 15c saturates opacifying layer 12c layer 16c of the image medium, and reservoir 14c.

Effective radiation scattering is accomplished by pore or particle sizes approaching or exceeding the wavelength of incident radiation. If the incident radiation is visible light, having a wavelength of at least 4,000 to 7,700 angstroms, particle or pore sizes of approximately one-half to 1 micron are ideal to scatter the radiation. To obtain a preferred opacifying effect when opacifying layer is mostly depleted of liquid, the layer has at least 10 particles or voids in its cross-sectional thickness. An ideal thickness of the opacifying layer is therefore 25 to 130 microns, or approximately 1 to 5 mils. Beyond 130 to 135 microns, the opacifying layer loses transparency in the first condition when wetted by the liquid unless the indices of refraction of the liquid and the layer differ by less than 0.1.

The scattering of incident radiation 30a and 32a when liquid is depleted from reservoir 14c and opacifying layer 12c is depicted in FIG. 4B. The image medium including layer 16c and pigments 18c are invisible when viewed from above.

Figure 5:
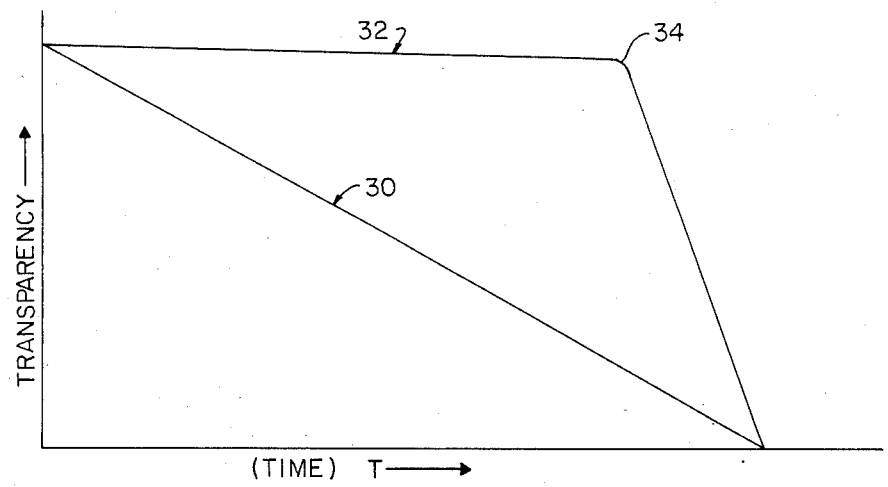
FIG. 5 shows variation of transparency versus time for depletion of the opacifying layer.

It is also desirable for the opacifying layer to have a miniminal thickness in relation to the reservoir because the more liquid held by the opacifying layer itself, the greater the time required for the liquid to to be depleted from the opacifying layer and the less abrupt the final visual change. FIG. 5 shows variation of transparency versus time T, curves 30 and 32. Curve 30 represents an indicator when the opacifying layer serves as the only reservoir. The transparency decreases slowly over time as the liquid gradually evaporates from the opacifying layer. Curve 32 represents an indicator having a reservoir that is greater in capacity than the opacifying layer. The opacifying layer remains in the first condition along curve 32 as long as liquid remains in the distinct reservoir until, at point 34, the reservoir is depleted of liquid while the opacifying layer is still saturated. After point 34, the thin opacifying layer abruptly loses transparency and becomes opaque. For instance, using a liquid such as 1-tetradecene, a reservoir holding 350 mg. of liquid per square inch, and an opacifying layer made of 0.002 inch of calcium stearate with a polyvinylacetate binder, in normal use the opacifying layer does not begin to become opaque until the twenty-seventh day of a thirty-day period at 70° F.

This same indicator loaded with the same amount of pentadecene, whose evaporation rate is known experimentally to be 31% as rapid as that of tetradecene, will begin changing its appearance after 27/.31=87 days. Alternatively a mixture of tetradecene and pentadecene could be employed to achieve any desired intermediate life span, at some cost in the brevity of the color change interval as previously explained.

For use at elevated temperatures, as for example to monitor adequate cure of composite structures such as aircraft parts which must be heated to a specified temperature for a specified time period, less volatile liquids will be required and thermally stable components must be employed throughout the indicators. Simultaneous use of indicators with different time and temperature lifetimes could provide accurate protection against both over-cure and under-cure. The principles of operation, however, remain unchanged. Preferred working liquids are the polydimethylsiloxanes with more than six silicon atoms, which combine low vapor pressure with stability, nonflammability and good optical properties. Particulate opacifying layers for high temperature use can be made from finely divided calcium or magnesium fluoride, with binders such as water-soluble silicates. Reservoirs for such indicators may be porous, sintered ceramics, and a vapor barrier layer may be provided by a nonporous fused or glazed ceramic.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A color-change indicator comprising:
   a liquid having a predetermined index of refraction and rate of evaporation;
   a reservoir for holding said liquid; and
   an opacifying layer of microporous material having an index of refraction approximately the same as that of the liquid, said opacifying layer overlying the reservoir and having an open-cell network of pores for absorbing the liquid from the reservoir, and said opacifying layer being in a first scattering condition for incident radiation when said liquid occupies said opacifying layer and in a second scattering condition when said liquid is depleted from said opacifying layer.

2. The indicator of claim 1 in which the opacifying layer is transparent in the first condition and opaque in the second condition due to internal ray scattering of incident radiation.

3. The indicator of claim 2 further including an image medium which is invisible when the opacifying layer is in the first condition and visible during the second condition.

4. The indicator of claim 3 in which the image medium includes a message element located in and penetrating through the opacifying layer which remains transparent in the second condition.

5. The indicator of claim 4 in which the message element is impressed on said opacifying layer.

6. The indicator of claim 5 in which the impression collapses a sufficient number of pores in the opacifying layer to allow transmission of incident radiation.

7. The indicator of claim 4 in which the message element is defined by resin having an index of refraction similar to that of the opacifying layer.

8. The indicator of claim 4 in which the image medium includes a layer of colored pigments beneath the opacifying layer.

9. The indicator of claim 3 in which the image medium includes: a message element located above the opacifying layer and having colored pigments; and a colored layer beneath the opacifying layer and having colored pigments similar in color to those of the message element.

10. The indicator of claim 2 further including an image medium which is visible when the opacifying layer is in the first condition and invisible during the second condition.

11. The indicator of claim 10 in which the image medium includes a message element located above the opacifying layer, having a visual appearance which matches that of the opacifying layer in the second condition such that the message element is visible in the first condition and invisible in the second condition.

12. The indicator of claim 10 in which the image medium includes a message element located beneath the opacifying layer.

13. The indicator of claim 12 in which the message element includes pigments in a porous adhesive which bonds the opacifying layer to the medium.

14. The indicator of claim 1 in which the reservoir includes macroporous absorbent material having pores larger than pores of the opacifying layer.

15. The indicator of claim 1 in which the liquid is transparent.

16. The indicator of claim 1 further including at least a second liquid having a different predetermined rate of volatilization.

17. The indicator of claim 1 in which the opacifying layer has an index of refraction within 0.1 of the index of the liquid.

18. The indicator of claim 1 in which the opacifying layer is less than 135 microns in thickness.

19. The indicator of claim 1 in which the opacifying layer has a cross-sectional thickness including at least ten pores.

20. The indicator of claim 19 in which the average size of the pores is at least as large as the wavelength of incident radiation.

21. The indicator of claim 1 in which the opacifying layer includes particles having an index of refraction approximately the same as that of the liquid.

22. The indicator of claim 21 in which the opacifying layer has a cross-sectional thickness including at least ten of said particles.

23. The indicator of claim 22 in which the average size of the particles is at least as large as the wavelength of incident radiation.

24. The indicator of claim 1 in which the opacifying layer remains in the first condition until the liquid is depleted from the reservoir and then abruptly changes to the second condition.

25. The indicator of claim 1 further including a removable barrier, overlying at least a portion of the opacifying layer, for retarding volatilization.

26. The indicator of claim 1 further including means for mounting the indicator on a product to be monitored.

27. The indicator of claim 1 in which the opacifying layer covers one portion of the reservoir and a vapor-barrier layer covers the remaining portion.

28. The indicator of claim 27 in which the reservoir is flattened in shape having the opacifying layer on its upper surface and the barrier layer on its lower surface.

29. A color-change indicator comprising:
   a liquid having a predetermined index of refraction and rate of evaporation;
   a reservoir for holding said liquid; and
   an opacifying layer of microporous material having an index of refraction similar to that of the liquid, said opacifying layer overlying the reservoir and having an open-cell network of pores for absorbing the liquid from the reservoir and for accomplishing release of said liquid at said rate of evaporation, said opacifying layer being in first scattering condition for incident radiation when said liquid occupies said opacifying layer and in a second scattering condition when said liquid is depleted from said opacifying layer, said opacifying layer remaining in the first condition until the liquid is depleted from the reservoir and then abruptly changing to the second condition within generally ten percent of the evaporative lifetime of said liquid.

30. A color-change indicator comprising:

a liquid having a predetermined index of refraction and rate of evaporation;

a reservoir for holding said liquid;

an opacifying layer of microporous material having an index of refraction similar to that of the liquid, said opacifying layer overlying the reservoir and having an open-cell network of pores for absorbing the liquid from the reservoir and for accomplishing release of said liquid at said rate of evaporation, said opacifyig layer being in a first scattering condition for incident radiation when said liquid occupies said opacifying layer and in a second scattering condition when said liquid is depleted from said opacifying layer; and an image medium which is visible in one of said conditions and invisible in the other of said conditions.

31. A method of indicating passage of time and temperature or depletion of a fluid comprising:

placing a liquid of known index of refraction and rate of evaporation into a reservoir;

overlying the reservoir at least partially with an opacifying layer of microporous material having an index of refraction similar to that of the liquid and having an open-cell network of pores for absorbing the liquid from the reservoir; and depleting the liquid from the opacifying layer at the rate of evaporation of the liquid to change the opacifying layer from one radiation-scattering condition when it is occupied by said liquid to a second radiation-scattering condition when the liquid is depleted.

32. The method of claim 31 in which the step of overlying includes laminating a film of microporous material to the reservoir.

33. The method of claim 31 in which the step of overlying includes coating the reservoir with a mixture of particles in a water-soluble solvent.

34. The method of claim 31 in which the step of overlying includes coating the reservoir with a solution of a polymer in a water-soluble solvent and immersing the reservoir in water.

* * * * *